J. V. SKOGLUND.
METHOD OF CONCENTRATING SULFURIC ACID.
APPLICATION FILED MAY 4, 1916.
1,232,109.
Patented July 3, 1917.
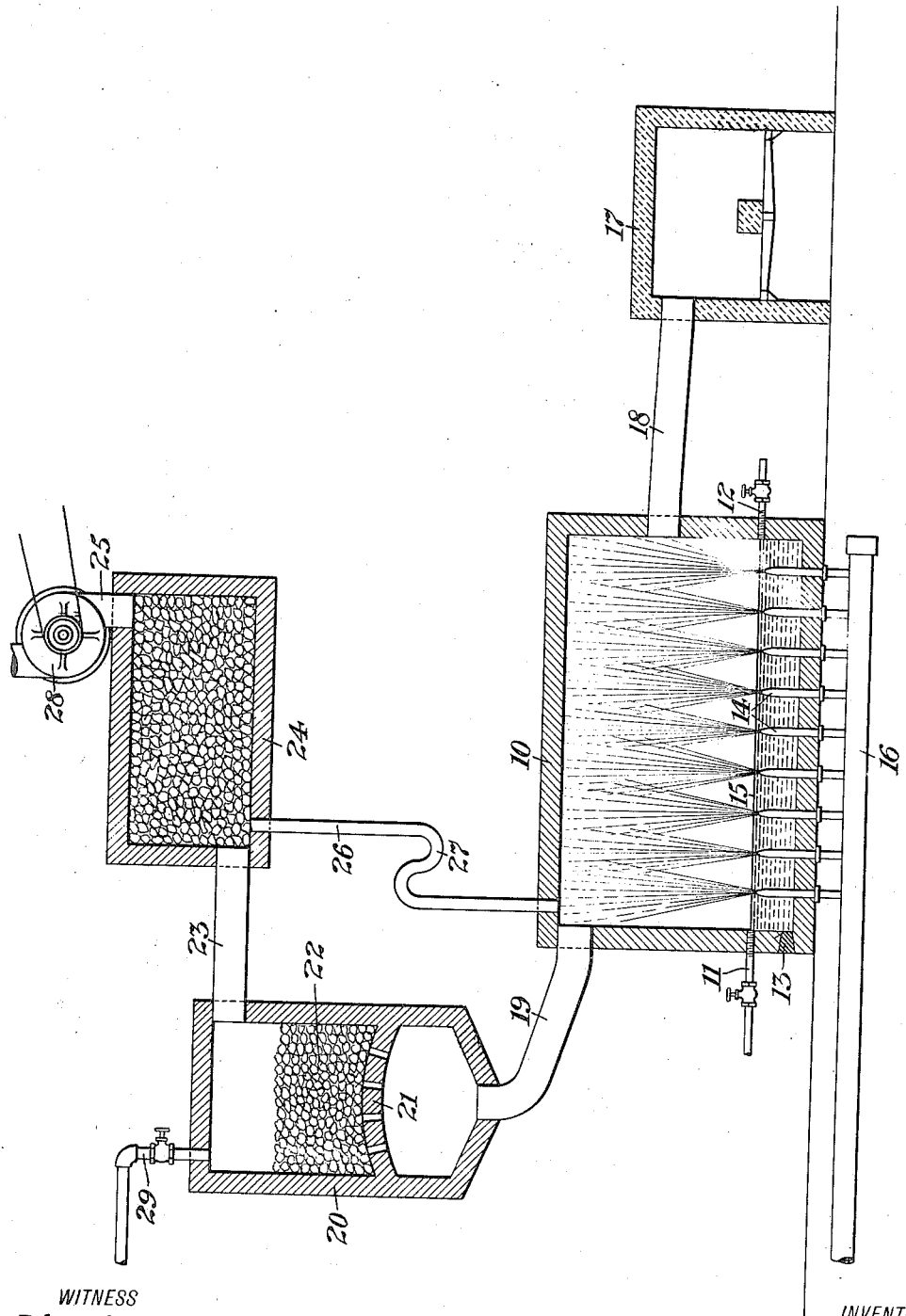
WITNESS
Chas. F. Clagett
INVENTOR
Jean V. Skoglund
BY
HIS ATTORNEYS

UNITED STATES PATENT OFFICE.

JEAN V. SKOGLUND, OF BROOKLYN, NEW YORK.

METHOD OF CONCENTRATING SULFURIC ACID.

1,232,109.  Specification of Letters Patent.  Patented July 3, 1917.

Application filed May 4, 1916. Serial No. 95,300.

*To all whom it may concern:*

Be it known that I, JEAN V. SKOGLUND, a citizen of the United States, residing in the borough of Brooklyn, county of Kings, city and State of New York, have invented an Improved Method of Concentrating Sulfuric Acid, of which the following is a specification.

This invention relates to the manufacture of sulfuric acid and more particularly to an improved method of concentrating sulfuric acid.

Heretofore in the concentration of sulfuric acid by the well known tower systems many difficulties have been experienced due principally to the impurities in the acid which soon form a coating that obstructs the free passage of the acid and the draft through the tower. Due also to the very corrosive action of sulfuric acid and the high temperature employed in its concentration various other difficulties have been experienced in concentrating sulfuric acid.

Now the object of my invention is to overcome these difficulties and in carrying out the same the acid under treatment or that to be concentrated is fed or supplied to a vessel or pan which is preferably long and narrow and inclosed so that the body of the acid under treatment is long, narrow and comparatively shallow, the concentrated acid being withdrawn from the end of the pan opposite that at which it is admitted. This liquid under treatment is blown preferably upwardly in the form of a fine spray or mist by any means adapted for this purpose. Hot gases of any suitable kind are then passed through the spray to concentrate the acid which is permitted to fall back into the body of the acid under treatment. The impurities in the acid as well as any impurities collected from the gases are thus returned to the body of the acid under treatment and settle to the bottom of the same where they may be removed by any suitable means. The resultant gases are passed off and through a mass of acid proof material which collects the acid particles in the mist or the greater part of them and permits the water vapor to pass on. The resultant gases may then be passed to a scrubber or similar apparatus where any acid particles still remaining in the mist are collected and returned to the body of the acid under treatment and the remaining water vapors in the mist are permitted to escape.

In the drawing I have illustrated an apparatus adapted for carrying out my invention in which the parts employed are shown diagrammatically.

Referring to this drawing one form of apparatus adapted for use in carrying out my invention comprises a closed vessel 10 made of lead and lined with an acid resisting material, which vessel is preferably long and narrow. The bottom of the vessel is adapted to contain the acid to be concentrated and at one end there is provided an acid inlet 11 and at the opposite end an acid outlet 12. One or more suitable plugs or covers 13 normally closing hand holes may also be provided in the vessel for the purpose of opening the vessel to remove the impurities which may settle to the bottom of the vessel. In the bottom of the vessel 10 there is provided a series of nozzles 14 preferably placed centrally and in alinement with one another. These nozzles extend sufficiently far into the vessel to have their orifices lie a short distance below the normal surface of the acid under treatment, which surface is indicated at 15. Also as indicated these nozzles are connected to a supply pipe 16 in communication with a suitable source of compressed air or steam under pressure by which in carrying out the method the acid under treatment is blown into a series of fountain like sprays also indicated diagrammatically in the drawing. I also employ a burner or oven 17 connected by a pipe or flue 18 to the discharge end of the acid container or vessel 10 it being understood that the burner may be of any suitable type to accomplish the desired purpose in supplying a suitable gas at the required temperature to the interior of the vessel 10 and that any suitable agency may be employed for separating particles of the acid under treatment into a spray, and spreading the same so that in returning to the body of the acid they may be subjected to the hot gases employed.

From the opposite or inlet end of the vessel 10 the pipe 19 connects the same with a tower 20 in which there is a partition wall or arch 21 supporting a mass of acid proof material indicated at 22. This as it will be understood may be of any suitable substance, but I prefer to employ the commercial article known as quartz. Leading from the tower 20 is a pipe 23 which connects the same to a scrubber 24. A discharge pipe 25 leads from the scrubber and a drip pipe 26 also connects the same through a trap 27 with the vessel 10. A suitable draft may be obtained in the apparatus by the use of a fan or blower 28 as indicated or by employing a suitably placed nozzle for injecting steam, or any other gas, under pressure.

From the foregoing description it will be understood that in carrying out this method the acid to be concentrated is supplied to the vessel 10 through the inlet pipe 11 and while in the vessel 10 is repeatedly blown into a series of sprays by the compressed air or other gas admitted through the nozzles 14. The hot gases from the burner or oven 17 are passed through the sulfuric acid spray to concentrate the same, particles of the acid continuously falling back into the body of the acid under treatment. It will be noted that the acid is admitted at the cooler end of the vessel or container 10 and the concentrated acid withdrawn from the hotter end of the same or that at which the hot gases are admitted.

The resultant gases as will be apparent contain a certain percentage of sulfuric acid and these are carried through the pipe 19 to the tower 20 in which by the acid proof material, the acid particles in the mist are collected and are permitted to return from the bottom of the tower through the pipe 19 to the container 10 and hence to the body of acid under treatment. The resultant gases after passing through the mass of acid proof material 22 may be carried by a pipe 23 to the scrubber 24 which collects the remaining acid particles in the mist, returning the same through the drip pipe 26 and trap 27 to the container 10, whereby as will be understood they are eventually returned to the body of acid under treatment, the remaining water vapor in the mist being permitted to escape through the discharge pipe 25.

It will be understood that in some instances it may be desirable to introduce the acid to be treated at the top of the tower 20. For this purpose the tower is provided with an acid inlet pipe 29 in which as well as in the inlet pipe 11 there is fitted a valve or cock, it being understood that when the liquid is supplied through the pipe 11 the valve in the pipe 29 is closed and when the liquid is supplied through the pipe 29 the valve in the pipe 11 is closed. It will furthermore be understood that when the liquid is supplied to the top of the tower 20 the return from the scrubber may also be introduced at the top of the tower without departing from the nature and spirit of my invention.

It will also be understood that the hereinbefore described process may be carried out by raising the acid to be treated to a predetermined height and permitting it to fall like rain back into the body of the acid under treatment at the same time passing the heated gases through the same; and the method may also be applied to the well known Glover tower system for concentrating sulfuric acid in which instance the spray nozzle is located in the bottom of the tower and by which as in the method hereinbefore described the acid is blown to a spray through which the heated gases are passed, in which instance the dust in the gases is taken up and retained by the acid spray and passes with the same from the tower, thereby preventing the dust from clogging the tower.

I claim as my invention:

1. The hereinbefore described method of concentrating sulfuric acid, consisting in positively blowing the surface portion of a body of acid into a spray, permitting the spray to fall back into the body of acid under treatment, and passing hot gases through the acid spray.

2. The hereinbefore described method of concentrating sulfuric acid, consisting in positively creating a spray from a portion of the body of the acid to be concentrated, passing heated gases through this acid spray, permitting the spray to continuously fall back into the body of the acid from which it was taken, passing the resultant gases through a mass of acid-proof material to collect acid particles therein, returning these so collected acid particles to the body of acid under treatment, and permitting the water vapor in the resultant gases to escape.

3. The hereinbefore described method of concentrating sulfuric acid consisting in injecting a gas under pressure below the surface of the body of sulfuric acid to be concentrated so as to continuously blow portions of the same into a spray which falls back into the body of acid being treated, and passing heated gases through the sulfuric acid spray.

4. The hereinbefore described method of concentrating sulfuric acid, consisting in admitting the acid to be treated into a container, positively creating portions of the acid in the container into a spray, passing heated gases through this acid spray, permitting the acid spray to continuously fall back into the body of acid in the container, passing the resultant gases through a mass of acid-proof material to collect acid particles and return the same to the acid in the container, and withdrawing the concentrated acid from the container opposite the point at which the acid is admitted thereto.

5. The hereinbefore described method of concentrating sulfuric acid, consisting in admitting acid to be treated into one end of a container, positively blowing a spray from a portion of the body of acid within the container, passing heated gases through the acid spray in the container, permitting the acid spray to continuously fall back into the body of acid in the container, and withdrawing the concentrated acid from the opposite end of the container.

6. The hereinbefore described method of concentrating sulfuric acid, consisting in admitting acid to be treated into a container at one end thereof, injecting a gas under pressure below the surface of the body of acid in the container so as to continuously blow portions of the same into a spray which is permitted to fall back into the body of acid in the container, and passing heated gases through the acid spray in the container.

7. The hereinbefore described method of concentrating sulfuric acid, consisting in passing the acid to be treated through a mass of acid proof material and into a container adapted to hold a body of acid, positively creating a spray from a portion of the body of acid in the container which is permitted to fall back into the body of acid therein, passing heated gases through the spray in the container, passing the resultant gases through the body of acid-proof material in a direction opposite that in which the acid first passed in being admitted to the container in order to collect acid particles in the mist and permit them to return to the body of acid in the container, and permitting the water vapor in the mist to escape.

8. The hereinbefore described method of concentrating sulfuric acid, consisting in passing the acid to be treated through a mass of acid-proof material and into a container adapted to hold a body of acid, injecting a fluid under pressure beneath the surface of acid in the container to blow the same into a spray which is permitted to fall back into the body of acid, passing heated gases through the spray in the container, passing the resultant gases through the body of acid-proof material in a direction opposite that in which the acid first passed in being admitted into the container in order to collect acid particles in the mist and permit them to return to the body of acid in the container, and permitting the water vapor in the mist to escape.

Signed by me this 1st day of May, 1916.

JEAN V. SKOGLUND.